June 16, 1942.  G. M. MAGRUM  2,286,290
HYDRAULIC SHOCK ABSORBER VALVING ASSEMBLY
Filed May 15, 1941  2 Sheets-Sheet 1
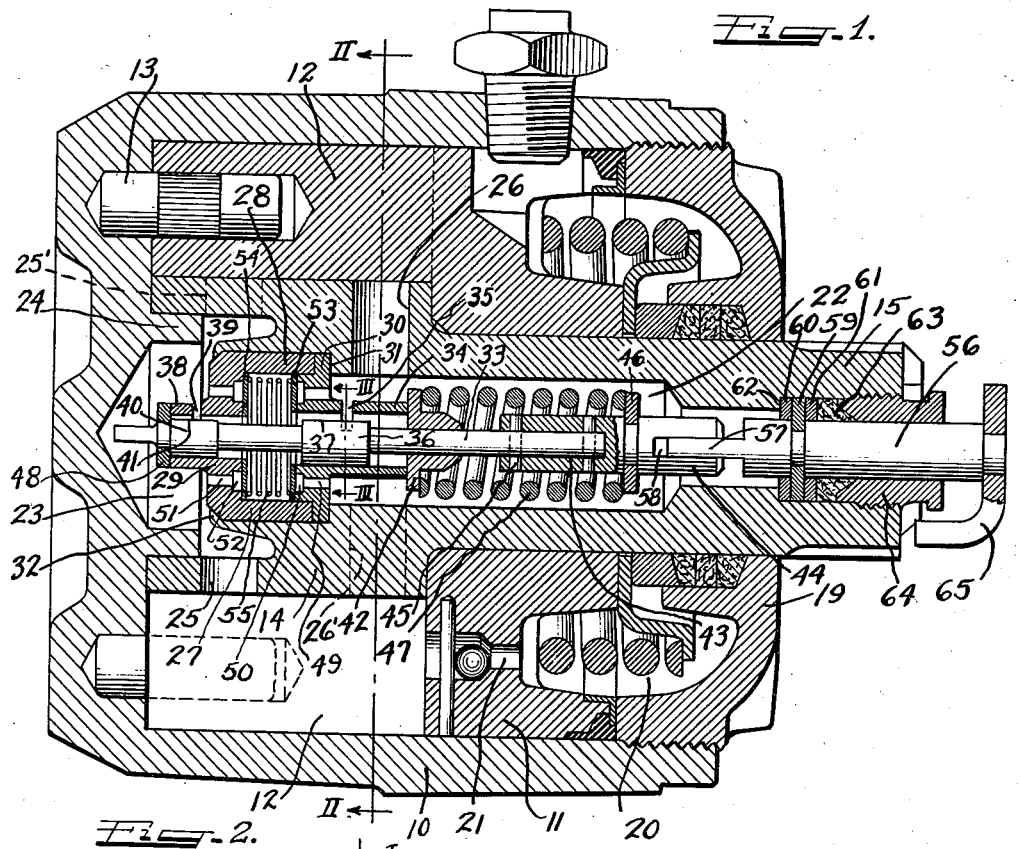
Fig. 1.
Fig. 2.
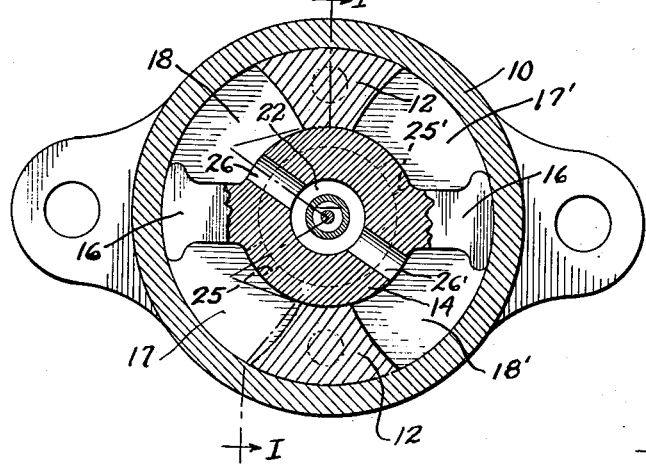
Fig. 3.
Inventor
GERVASE M. MAGRUM.
by Charles O'Neill Atty.

June 16, 1942.  G. M. MAGRUM  2,286,290
HYDRAULIC SHOCK ABSORBER VALVING ASSEMBLY
Filed May 15, 1941  2 Sheets-Sheet 2

Inventor
GERVASE M. MAGRUM.

Patented June 16, 1942

2,286,290

UNITED STATES PATENT OFFICE 2,286,290

HYDRAULIC SHOCK ABSORBER VALVING ASSEMBLY

Gervase M. Magrum, Buffalo, N. Y., assignor, by mesne assignments, to Houdaille-Hershey Corporation, Detroit, Mich., a corporation of Michigan Application May 15, 1941, Serial No. 393,527

5 Claims. (Cl. 188—100)

This invention relates to hydraulic shock absorbers and particularly to improved valving arrangement therefor for controlling the fluid flow and thereby the resistance characteristics of the shock absorber.

The invention is particularly adaptable in shock absorbers of the rotary type employed on automotive vehicles, and an important object of the invention is to provide separate orifices for controlling the bound and rebound hydraulic fluid flow but with means for effecting simultaneous adjustment of both orifices.

A further object is to provide static valves for resisting the fluid flow during the starting or slow movements of the vehicle spring until the pressure becomes sufficient to open these valves for control of the fluid flow by the orifices.

Another important object is to provide separate blow-off valves for the bound and rebound flow which valves may be designed and arranged to effect the same blow-off resistance for both bound and rebound flow or for different blow-off resistance.

Another important object is to provide a compact valving assembly which may be easily installed into a shock absorber and of which the parts may be readily adjusted from the exterior of the shock absorber for the desired flow control.

The above enumerated and other features of the invention are incorporated in the structure shown on the drawings, in which drawings:

Figure 1 is a section on plane I—I of Figure 2 of a hydraulic shock absorber with my improved valve assembly installed;

Figure 2 is a reduced section on plane II—II of Fig. 1;

Figure 3 is a section on plane III—III of Figure 1;

Figure 4:
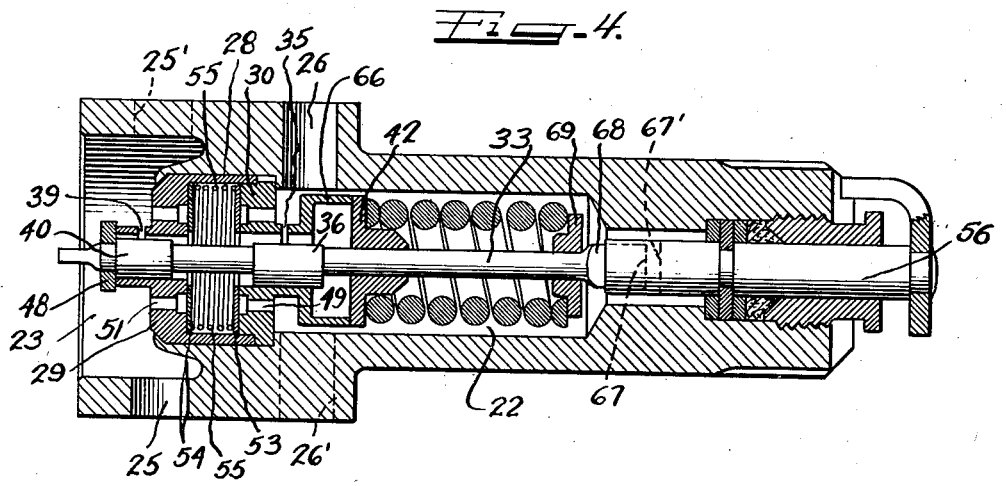
Figure 4 is a longitudinal section of a modified form of valving assembly.

Briefly describing the shock absorber, it comprises a cup-shaped housing 10 having the bearing wall 11 therein from which extend the abutments 12 for engagement with the base of the housing, pins 13 holding the wall and abutments against rotational displacement. The piston structure comprises the cylindrical hub 14 from which the shaft 15 extends through the bearing wall 11. The shock absorber body is usually secured to the chassis of the vehicle and the end of the piston shaft is connected by a suitable lever with the axle.

The piston hub 14 has vanes 16 extending therefrom which, with the abutments 12 define hydraulic working chambers 17, 17' and 18, 18'. A cover structure 19 screws into the outer end of the housing 10 to hold the bearing wall 11 and the abutments in service position, and the wall 11 and the cover have opposed recesses providing a reservoir 20 for hydraulic fluid flow which is fed to the working chambers through check valve controlled passageways 21, in a manner well known in the art.

The piston shaft has the bore 22 therethrough which at its inner end is enlarged to form a chamber 23 into which projects an annular boss 24 on the housing base which provides additional bearing support for the piston structure. The chamber 23 communicates with the working chambers 17, 17' through passages 25 and 25' extending through the piston hub, while the end of the bore 22 communicates with the working chambers 18, 18' through passageways 26 and 26'. Seated in the inner end of the shaft bore 22 to be interposed between the two sets of passageways 25, 25' and 26, 26' is a valve seat member 27 of cylindrical shape. This seating member comprises the annular wall 28, the inner end wall 29 which may be integral with the wall 28, and the outer end wall 30 which may be separate but secured to the annular wall. The piston hub provides the shoulder 31 against which the valve seating member seats and against which it is held, as by peening against the inner end thereof the metal 32 of the hub.

Extending through shaft bore and through openings in the outer and inner end walls of the seating member is a valve stem 33. Extending outwardly a distance from the outer end wall of the seating member to form a continuation of the opening in this end wall is the annular flange 34 which has a circumferentially extending orifice slot 35 therethrough. On the valve stem is a collar 36 concentric with the stem and fitting in the flange 34, said collar at one side being slabbed off to provide a valve port 37, as best shown on Figure 3. This valve port, upon rotary adjustment movement of the valve stem, will expose more or less of the orifice 35 for the desired resistance to hydraulic fluid flow, as will be described more in detail later.

The inner end wall 29 of the valve seating member 28 has the annular flange 38 extending therefrom which is provided with a circumferentially extending orifice slot 39. A valve collar 40 on the valve stem is slabbed off to provide a port 41 for overlapping more or less of the orifice slot 39 for control of fluid flow.

Within the piston shaft bore and slidable on the valve stem 33 to seat against the outer end of the flange 34 is a blow-off valve 42. In the arrangement of Figures 1 and 2, the valve stem at its outer end projects into the bore 43 of an intermediate stem 44 to which it is rigidly secured as by pins 45. On this intermediate stem is an abutment washer 46 between which and the blow-off valve 44 is interposed the spring 47 which is normally tensed to a predetermined degree for exertion of pressure against the blow-off valve to hold it seated against the end of the flange 34.

Secured to the inner end of the valve stem 33 is a blow-off valve disk 48 which, by the force of the spring 47, is normally held seated against the inner end of the flange 38 on the valve seating member 28.

The outer end wall 30 of the seating member 28 has one or more passages 49 therethrough terminating in an annular channel 50 on the inner side of the wall. The inner end wall 29 of the seating member has one or more passageways 51 therethrough terminating in the annular channel 52 in the inner side of the wall. Within the seating member are the static valves 53 and 54 in the form of annular disks which are held concentric with the valve stem by the annular wall 28 of the seating member 27, the inner diameters of the disks being larger than that of the valve stem so as to leave passageways. A spring 55 between the valve disks serves to normally hold the disk 53 against the inner side of the outer end wall 30 of the seating member 28 and the valve disk 54 against the outer side of the inner wall 29 of the seating member so that the passageways through the end walls will be normally closed.

In the arrangement shown on Figure 1, an adjusting stem 56 extends from the piston shaft bore to the exterior thereof and at its inner end has a tongue 57 engaging in a slot 58 in the outer end of the intermediate stem 44, so that upon turning of the adjusting stem 56 the valve stem 33 will be set for the desired overlap of the orifice slots 35 and 39 by the valve collars 36 and 40. The adjusting stem 56 is held against axial movement by a washer 59 clamped between washers 60 and 61 held to a shoulder 62 by the pressure of packing 63 by the plug 64 threading into the outer end of the shaft bore, an arm 65 on the outer end of the adjusting stem 56 facilitating its rotation for adjustment of the orifices.

In the arrangement shown on Figures 1 and 2, the orifice 39, the static valve 53, and the blow-off valve 48 will control the compression flow, that is the flow caused by compression of the vehicle spring, while the orifice 35, the static valve 54 and the blow-off valve 42 will control the rebound flow caused by the expansion or rebound movement of the vehicle springs. During initial or slow compression movement of the vehicle springs, the displaced hydraulic fluid will flow from the working chambers 18—18' through the passageways 26—26' into the shaft bore 22 and through passageways 49 in the seating member 28, such flow being resisted by the static valve 53 until the pressure becomes sufficiently great to unseat this valve against the comparatively light spring 55, the flow then continuing through the orifice 39 to the chamber 23 and through the passageways 25—25' to the chambers 17—17'. The orifice will then control the compression flow until abnormal flow conditions arise as by sudden and more violent compression movement of the vehicle springs. Such abnormal pressure will act against the outer end of the collar 40 and through the collar port 41 against the blow-off valve 48, this resultant pressure against the valve stem causing it to be shifted inwardly against the resistance of the spring 47 for movement of the blow-off valve 48 away from its seat so as to open a freer flow passageway for the fluid, but as soon as the abnormal pressure subsides, the spring 47 will function to reseat the blow-off valve 48, and the orifice 39 will then again assume control.

During rebound movement of the vehicle springs, the fluid in the shock absorber will be displaced from the work chambers 17—17', and the fluid flowing through the passages 51 in the seat member 28 will encounter the static valve 54 which will offer resistance to the flow until the flow pressure becomes sufficient to unseat the valve, the fluid then flowing through the port 37 of the valve collar 36 and through the orifice 35 and through the passageways 26—26' to the working chambers 18—18'. The orifice 35 will then meter and control the flow until blow-off pressure is reached whereupon the pressure will unseat the blow-off valve 42 for freer flow until the abnormal pressure is reduced, the orifice 35 then reassuming control. During rebound operation, some of the flow will be through the orifice 39, but this flow together with the main flow through the passageways 51 is metered through the orifice 35. On compression operation some of the fluid will flow through the orifice 35 to join the main flow through the passages 49 to be metered by the orifice 39.

By proportionment of the areas of the blow-off valves exposed to blow-off pressure, the blow-off resistance of one valve may be made greater or less than that of the other. On Figure 4 the valving arrangement is the same as that shown on Figures 1 and 2 with the exception that the annular seating flange 66 on the valve seat member 28 provides greater blow-off pressure area for the blow-off valve 42 than is provided for the blow-off valve 48, less pressure per square inch being therefore required to unseat the blow-off valve 42 than will be required for unseating of the blow-off valve 48.

Figure 4 also shows a modified arrangement for connecting the valve stem 33 with the adjusting stem 56. The outer end of the valve stem 33 is flattened out to form a tongue 67 for engaging in the slot 67' of the adjusting stem, this flattened end also providing an abutment shoulder 68 for the abutment washer 69 for the outer end of the spring 47 which resists the operation of the blow-off valve.

Figure 5:
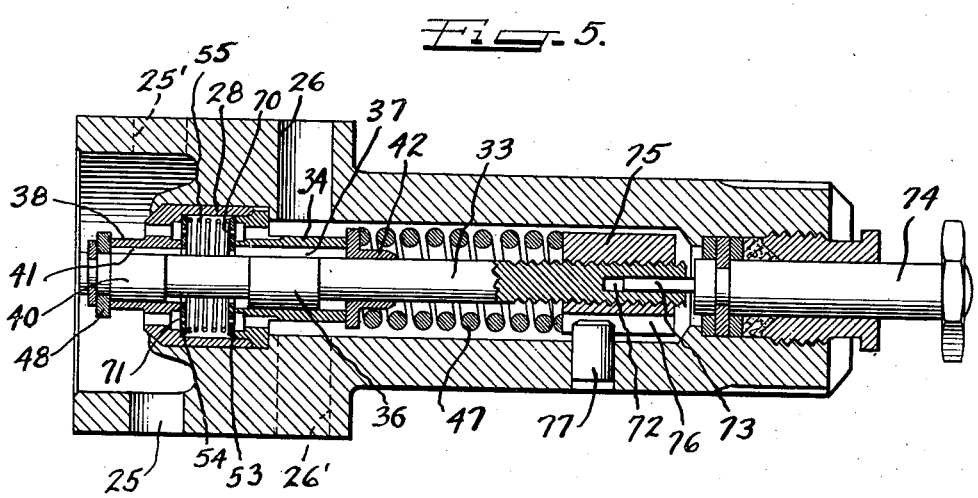
Figure 5 is a longitudinal section of another modified form of valving assembly.

In the modified arrangement shown on Figure 5, the valving assembly is the same as in Figure 1 except that adjustable orifices, such as 35 and 39, are omitted and the normal flow is metered by orifices in the check or static valves 53 and 54, the ports 37 and 41 in collars 36 and 40 then serving only to provide passageways for the flow of the fluid against the blow-off valves 42 and 48. The valve 53 is provided with one or more metering orifices 70 and the valve 54 is provided with one or more metering orifices 71. With this arrangement the flow from the passageways 25—25' will unseat the valve 71 and will be metered by the orifices 70 in the valve 53 on its way to the passageways 26—26'. The reverse flow will unseat the valve 53 and be metered by the orifices 71 in the valve 54. Abnormal pressure impulses in one direction will unseat the blow-off valve 42, and in the other direction the blow-off valve 48 will be unseated, both blow-off valves being resisted by the spring 47.

Figure 5 also shows an arrangement by which adjustments for normal compression of the spring 47 may be made. The valve stem 33 at its outer end has the slot 72 receiving a tongue 73 on the adjusting stem 74, this tongue and slot connection permitting axial movement of the valve stem 33 in response to blow-off pressure on the blow-off valve 48. The outer end of the stem 33 is threaded to receive a nut 75 which has the longitudinally extending channel 76 for receiving a pin 77 on the piston shaft. When the adjusting stem 74 is turned, the nut 75 which is locked against rotation by the pin 77 will be shifted longitudinally on the valve stem 33 for imposing more or less normal compression on the spring 47 for the desired resistance to blow-off valve operation.

I have thus produced valve assembly for hydraulic shock absorbers which will efficiently control the hydraulic fluid flow for control of vehicle springs throughout their range of movement. I do not, however, desire to be limited to the construction and arrangement shown and described as changes and modifications may be made without departing from the scope of the invention.

I claim as my invention:

1. Valving assembly for controlling the bound and rebound flow in a hydraulic shock absorber comprising a seating member interposed in the fluid flow, said seating member defining a path therethrough for bound flow and said path including an orifice port at one end of said seating member, said seating member providing another path therethrough for rebound flow and said path including an orifice port in the other end of said seating member, a valve stem rotatable and shiftable in said seating member, valves on said valve stem adapted upon rotational adjustment of said stem for cooperation with said orifice ports for defining the areas therethrough for the desired resistances to the bound and rebound flows, a blow-off valve for the bound flow mounted on the inner end of said valve stem for seating against the inner end of said seating member, a blow-off valve for the rebound flow slidable on said stem for seating engagement with the outer end of said seating member, an abutment on said stem at the outer end thereof, a spring interposed between said abutment and the rebound blow-off valve for normally holding both blow-off valves seated, abnormal bound or rebound flow pressure causing unseating of the respective blow-off valves for opening a comparatively low resistance flow path in shunt of the respective orifice port, and means for effecting rotation of said stem for simultaneous adjustment of said orifice ports by said valve members.

2. Valving assembly for controlling the bound and rebound flow in a hydraulic shock absorber comprising a seating member disposed in the path of the flow and comprising an annular wall and inner and outer end walls, said end walls being each provided with flow passageways therethrough, static valves within said seating member and a common spring normally holding said static valves against said end walls to close the passageways therethrough against bound and rebound flow respectively, the bound and rebound flow respectively opening one of said static valves against said spring but holding the other static valve closed, and separate metering orifice means for the bound and rebound flow respectively when the corresponding static valve is held closed.

3. Valving assembly for controlling the bound and rebound flow in a hydraulic shock absorber comprising a seating member disposed in the path of the flow and comprising an annular wall and inner and outer end walls, said end walls being each provided with flow passageways therethrough for bound flow and rebound flow respectively, static valves within said seating member, spring means normally holding said static valves against said end walls to close the passageways therethrough, the bound and rebound flow respectively opening one of said static valves against said spring means but holding the other static valve closed, and a separate restricted orifice in said seating member for each of said passageways for metering the respective flow when the corresponding valve is closed.

4. A valving assembly for controlling the bound and rebound flow in a hydraulic shock absorber comprising inner and outer seating walls disposed in the path of the flow and each having flow passageway therethrough, check valves in the form of disks between said seating walls and a spring normally holding said check valves against the inner sides of said walls for closing the passageways therethrough whereby bound flow and rebound flow respectively will open one of said valves against the spring but hold the other closed, and separate restricted metering orifice means for the bound flow and rebound flow respectively through which the respective flow will be metered when the corresponding check valve is held closed by said flow.

5. A valving assembly for controlling the bound and rebound flow in a hydraulic shock absorber comprising inner and outer seating walls disposed in the path of the flow and each having flow passageway therethrough, check valves in the form of disks between said seating walls and a spring normally holding said check valves against the inner sides of said walls for closing the passageways therethrough whereby bound flow and rebound flow respectively will open one of said valves against the spring but hold the other closed, means defining separate restricted metering orifices for the bound flow and rebound flow respectively through which the respective flow will be metered when the corresponding check valve is held closed by said flow, and means for simultaneously adjusting the size of said metering orifices.

GERVASE M. MAGRUM.